US012772251B2

(12) United States Patent
Govindan Nair et al.

(10) Patent No.: US 12,772,251 B2
(45) Date of Patent: Oct. 20, 2026

(54) ENHANCING TRAFFIC LOAD-SHARING ON A NETWORK ACCESS CLUSTER BASED ON UNEQUAL UPLINK BANDWIDTH

(71) Applicant: HEWLETT PACKARD ENTERPRISE DEVELOPMENT LP, Spring, TX (US)

(72) Inventors: Anoop Govindan Nair, Bangalore (IN); Vincent Giles, Grenoble (FR)

(73) Assignee: Hewlett Packard Enterprise Development LP, Spring, TX (US)

( * ) Notice: Subject to any disclaimer, the term of this patent is extended or adjusted under 35 U.S.C. 154(b) by 303 days.

(21) Appl. No.: 18/791,774

(22) Filed: Aug. 1, 2024

(65) Prior Publication Data

US 2025/0374279 A1 Dec. 4, 2025

(30) Foreign Application Priority Data

May 31, 2024 (EP) .................................... 24305868

(51) Int. Cl.
*H04W 72/21* (2023.01)
*H04W 72/0453* (2023.01)

(52) U.S. Cl.
CPC ....... *H04W 72/21* (2023.01); *H04W 72/0453* (2013.01)

(58) Field of Classification Search
CPC .............. H04W 72/21; H04W 72/0453; H04L 47/125; H04L 43/0811; H04L 45/28; H04L 63/0272
See application file for complete search history.

(56) References Cited

U.S. PATENT DOCUMENTS

| | | | |
|---|---|---|---|
| 11,803,375 | B2 | 10/2023 | Weldemariam et al. |
| 2014/0114867 | A1 | 4/2014 | Volkmann et al. |

(Continued)

FOREIGN PATENT DOCUMENTS

| | | | |
|---|---|---|---|
| CN | 117474567 | A | 1/2024 |

OTHER PUBLICATIONS

Boston Consulting Group, "CO2 AI Now a Standalone Software Company Backed by BCG and International Venture Capital Firms," Sep. 13, 2023, https://www.bcg.com/press/13september2023-co2-ai-now-standalone-software-company.

(Continued)

*Primary Examiner* — Rushil P. Sampat
(74) *Attorney, Agent, or Firm* — Hewlett Packard Enterprise Patent Department

(57) ABSTRACT

A system transmits, by a network access cluster, data to an upstream network device via a plurality of uplinks. The network access cluster includes a first and a second network device, which each communicate with the upstream network device via a first and second group of uplinks. The first and second network devices communicate with each other via a link. The system updates a first bandwidth associated with the first network device in response to detecting a failure in the first group of uplinks. Responsive to the first bandwidth being less than a second bandwidth associated with the second network device, the system sets a forwarding cost (e.g., to zero) of the link. Based on the zero-cost link, the system allows an additional path via the second network device for transmitting data received by the first network device to the upstream network device.

20 Claims, 7 Drawing Sheets

(56) References Cited

U.S. PATENT DOCUMENTS

| | | | | |
|---|---|---|---|---|
| 2015/0032871 | A1* | 1/2015 | Allan | H04L 47/125 709/223 |
| 2017/0180155 | A1* | 6/2017 | Shanks | H04L 12/4633 |
| 2019/0140955 | A1* | 5/2019 | Hemige | H04L 43/0811 |
| 2019/0173777 | A1* | 6/2019 | Chiu Chu | H04L 12/18 |
| 2020/0382248 | A1* | 12/2020 | Leng | H04W 72/12 |
| 2023/0236656 | A1 | 7/2023 | Thakkar | |
| 2025/0168103 | A1* | 5/2025 | Wen | H04L 47/125 |

OTHER PUBLICATIONS

Lavi, H., "Introducing Climatiq Autopilot: Calculate Scope 3 Emissions in Minutes—Not Weeks," Jan. 31, 2024, https://www.climatiq.io/blog/introducing-climatiq-autopilot.

Mizael, C., "Why CarbonCloud? Automated Modeling," Aug. 15, 2023, https://carboncloud.com/blog/automated-modeling/, 14 pages.

* cited by examiner

ENHANCING TRAFFIC LOAD-SHARING ON A NETWORK ACCESS CLUSTER BASED ON UNEQUAL UPLINK BANDWIDTH

BACKGROUND

Field

Two or more switches in a network access cluster may be configured to function and present as a single virtual switch. A typical cluster may include two switches (e.g., node A and node B) which communicate with each other via a link and with spine switches via corresponding uplinks. If an uplink from node A to a spine switch goes down, traffic flowing through node A will only be forwarded to the spine switches via the remaining uplinks from node A, and will not flow to the spine switches via other possible paths (e.g., via the link to node B to the spine switches). Only when all of the uplinks from node A fail does traffic flow via the link to node B to the spine switches. This may result in oversubscription to node A, which can result in dropped packets, failed transmissions, inefficient traffic flow, etc.

BRIEF DESCRIPTION OF THE FIGURES

In the figures, like reference numerals refer to the same figure elements.

DETAILED DESCRIPTION

Figure 1:
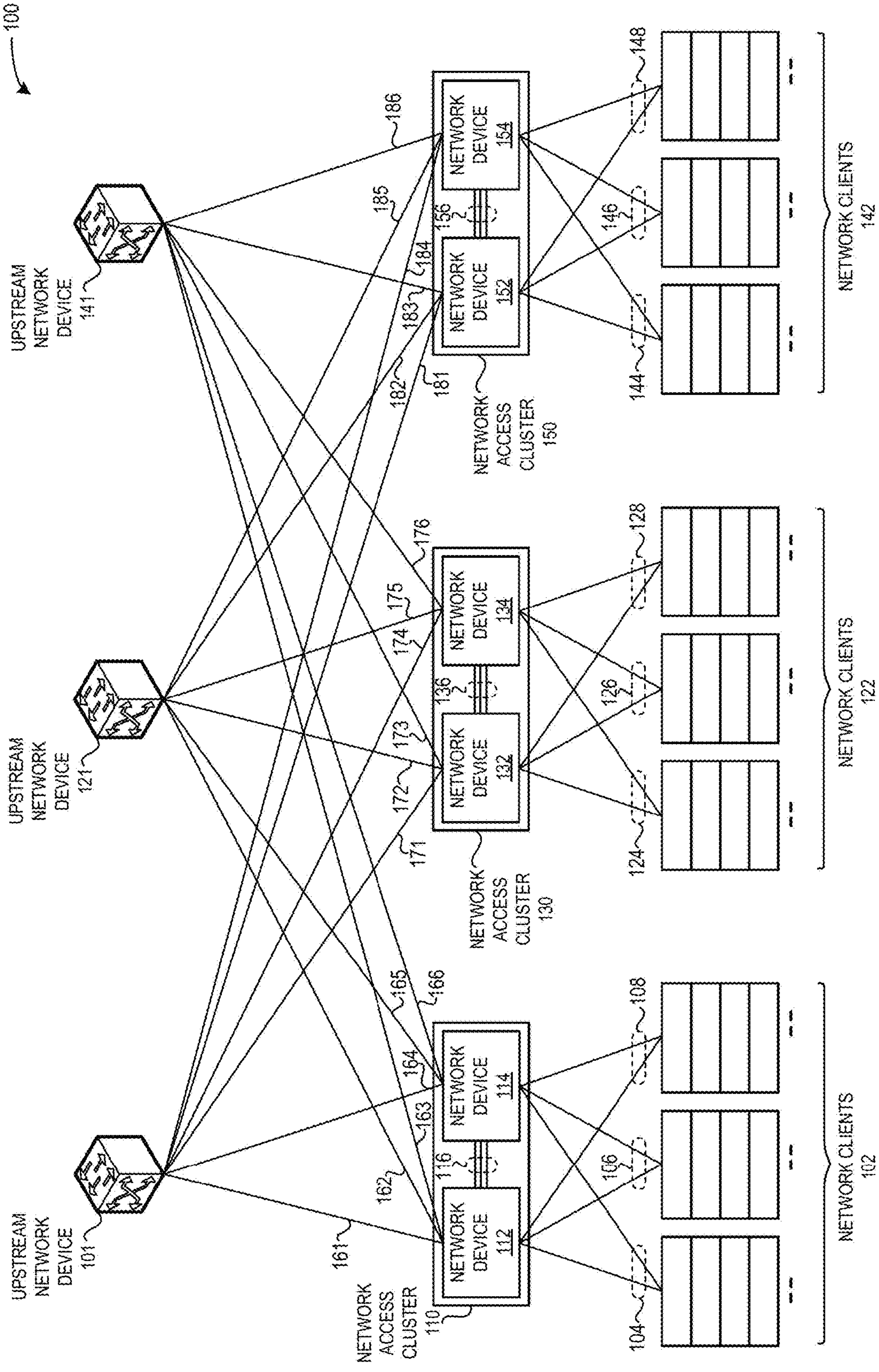
FIG. 1 illustrates an environment which facilitates enhancing traffic load-sharing in a network access cluster based on unequal uplink bandwidth, in accordance with an aspect of the present application.

Aspects of the instant application provide a system which facilitates enhancing traffic load-sharing in a network access cluster based on unequal uplink bandwidth. In a network access cluster with two nodes (e.g., switches), each with uplinks to an upstream network device, a first node can detect an uplink failure and update its bandwidth. If the bandwidth of the first node is less than the bandwidth of the second node, the first node can set the cost of a link between the two nodes to a value of zero, which allows an additional path for the first node to forward traffic destined for the upstream network device. The additional path can result in enhancing load-sharing of traffic in the network access cluster.

A network access cluster can include two or more network devices (e.g., switches, which can be referred to as "nodes") which may be configured to function as a single virtual switch. The switches in the network access cluster can communicate with each other via links. For example, in a Virtual Switching Extension (VSX) cluster, two switches (referred to as "node A" and "node B") may communicate with each other via an Inter-Switch Link (ISL). The network access cluster may receive traffic from hosts or network clients and forward the received traffic to upstream network devices (such as spine switches) via uplinks from each of the two nodes, e.g., via a first set of uplinks from node A and a second set of uplinks from node B. The uplinks to the upstream network device can determine the total bandwidth of each of nodes A and B. In a typical leaf-spine architecture, the network access cluster may be referred to as a leaf switch, while the upstream network device may be referred to as a spine switch, as described below in relation to FIG. 1.

If an uplink from node A to a spine switch goes down, traffic flowing through node A will only be forwarded to the spine switches via the remaining uplinks from node A, and will not flow to the spine switches via other possible paths (e.g., via the ISL and node B to the spine switches). Only when all of the uplinks from node A fail does traffic flow via the ISL and node B to the spine switches. This may result in oversubscription to node A, which can result in dropped packets, failed transmissions, inefficient traffic flow, etc.

The described aspects of the application provide an enhanced load-balancing mechanism for traffic flowing through a network access cluster to an upstream network device. In a network access cluster, such as a VSX cluster, two nodes (node A and node B) can communicate over an ISL. The system can enable effective load-balancing for traffic flowing to node A when an uplink of node A fails by allowing node A to consider Equal Cost Multi-Path (ECMP) for available routes from its peer node B. For example, if node A detects an uplink failure to a first spine switch, node A can update its bandwidth and, if the bandwidth of node A is less than the bandwidth of node B, node A can set the Open Shortest Path First (OSPF) forwarding cost of the ISL to a value of zero (if not already set at zero). This can allow an additional path for node A to forward traffic flowing out of node A, e.g., by treating the ISL hop as zero and effectively replacing the failed uplink path with a zero-cost path to node B, which can forward traffic via its available uplinks. Thus, an additional available route can be made available to node A, where the additional route has an equal cost from node B. A diagram depicting multiple paths with an equal cost is described below in relation to FIG. 1.

Thus, setting the OSPF cost to can be triggered based on detecting an uplink failure and determining that the bandwidth of node A is less than the bandwidth of node B. If node A detects a recovery of the failed uplink, node A can again update its bandwidth, and, if the bandwidth of node A is greater than or equal to the bandwidth of node B, node A can set the OSPF cost of the ISL to an original interface value, also referred to as an "original cost" (e.g., 30 gigabytes (GB)).

The condition which triggers node A to set the OSPF cost to zero is based on determining an unequal bandwidth between the cluster nodes and setting the OSPF cost of the ISL to zero only by (and from) the node with the lower bandwidth. This can prevent loops, i.e., a situation in which both node A and node B set the OSPF of the ISL to zero and continue to pass traffic back and forth due to the zero-cost path in both directions, as described below in relation to FIG. 1. In general, the described aspects depict a first node (e.g., node A) of a network access cluster performing enhanced traffic load-sharing by detecting a change in the total uplink bandwidth of node A, comparing the updated bandwidth to the total uplink bandwidth of a peer node, e.g., node B, and determining whether to set the cost of its link to the peer node to a value of zero. The operations of the described aspects are provided from the perspective of node A for illustrative purposes only. That is, the described aspects can occur continuously and at the same time on both peer nodes in a cluster (e.g., both node A and node B). Thus, both peer nodes can continuously monitor or track its own total uplink bandwidth, detect a change in its own bandwidth, compare the changed bandwidth to the total uplink bandwidth of its peer node (obtained via existing protocols for exchanging control information), and determine whether to set its respective link to its peer node to a cost of zero.

The term "network client" or "host" refers to a computing entity which may receive and transmit data, e.g., to another network client or host. A network client or host can be, e.g., a virtual local area network (VLAN), a set of hypervisors, a set of servers, or one or more computing entities which can transmit data and receive data.

The term "network device" refers to a computing device which can include software, hardware, or a combination of software and hardware, to communicate with other computing devices, including receiving and forwarding traffic. The term "node" may also be used to refer to a network device. An example of a network device can be a switch. An "adjacent" or "peer" network device of a first network device can refer to a network device which is coupled to the first network device via a link.

The terms "network access cluster" and "virtual cluster" are used interchangeably in this disclosure and refer to two or more network devices which can be configured to function as a single entity, e.g., as a single virtual switch. A network access cluster can include two or more network devices. Network devices in a network access cluster may communicate with each other over links. A network cluster can also include three or more network devices, nodes, or switches configured in a ring or other topology. An example of a network access cluster is a VSX cluster, which can include two nodes or switches that communicate with each other via an Inter-Switch Link (ISL).

The term "upstream network device" is used in this disclosure to refer to a device which resides in a path upstream of a network access cluster. An example of an upstream network device can be spine switch.

The term "leaf-spine topology" refers to a topology in which a leaf node (or leaf switch) can receive data from a downstream computing node and forward the data to an upstream spine node (or spine switch). The leaf switch can also receive data from the upstream spine switch and forward that data to the downstream computing nodes. In this disclosure a leaf node can include a network device of a network access cluster, e.g., a switch of a virtual cluster, and an upstream spine node can include an upstream network device, e.g., a spine switch.

In this disclosure, the term "switch" is used in a generic sense and can refer to any standalone network device or fabric switch operating in any network layer. The term "switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. The term "packet" should not be interpreted as limiting examples of the present invention to a particular layer of a network protocol stack. The term "packet" can be replaced by other terminologies referring to a group of bits, such as "message," "frame," "cell," "datagram," or "transaction." Furthermore, the term "port" can refer to a port that can receive or transmit data. The term "port" can also refer to the hardware, software, and/or firmware logic that can facilitate the operations of that port.

FIG. 1 illustrates an environment 100 which facilitates enhancing traffic load-sharing in a network access cluster based on unequal uplink bandwidth, in accordance with an aspect of the present application. Environment 100 can depict a leaf-spine topology and include network clients which communicate with each other via network access clusters (e.g., leaf nodes) and upstream network devices (e.g., spine switches). Each network access cluster can include a plurality of nodes, switches, or network devices. Network access cluster 110 can include network devices 112 and 114, which can communicate with each other over a link 116. Link 116 can be a link aggregation group (LAG). Network devices 112 and 114 can communicate with upstream network device 101 via respective groups of uplinks: network device 112 can communicate with upstream network devices 101, 121, and 141 via, respectively, uplinks 161, 162, and 163; and network device 114 can communicate with upstream network devices 101, 121, and 141 via, respectively, uplinks 164, 165, and 166.

Similarly, network access cluster 130 can include network devices 132 and 134, which can communicate with each other over a link (or LAG) 136. Network device 132 can communicate with upstream network devices 101, 121, and 141 via, respectively, uplinks 171, 172, and 173; and network device 134 can communicate with upstream network devices 101, 121, and 141 via, respectively, uplinks 174, 175, and 176. In addition, network access cluster 150 can include network devices 152 and 154, which can communicate with each other over a link (or LAG) 156. Network device 152 can communicate with upstream network devices 101, 121, and 141 via, respectively, uplinks 181, 182, and 183; and network device 154 can communicate with upstream network devices 101, 121, and 141 via, respectively, uplinks 184, 185, and 186.

When active and operating without error or failure, each of uplinks 161-166, 171-176, and 181-186 can have a bandwidth of, e.g., 100 GB. As a result, network device 112 can have a bandwidth of 300 GB when all three of its uplinks 161-163 are active and operating, and network device 114 can also have a bandwidth of 300 GB when all three of its uplinks 164-166 are active and operating.

Furthermore: network clients 102 can communicate with network devices 112 and 114 of network access cluster 110 via links 104, 106, and 108; network clients 122 can communicate with network devices 132 and 134 of network access cluster 130 via links 124, 126, and 128; and network clients 142 can communicate with network devices 152 and 154 of network access cluster 150 via links 144, 146, and 148. Each of links 104-108, 124-128, and 144-148 may have a lesser bandwidth (e.g., 25 GB) to a corresponding network access cluster than the bandwidth (e.g., 100 GB) of each uplink from a network device of a network access cluster to a corresponding upstream network device.

Thus, environment 100 depicts connectivity of each set of network clients (102, 122, and 142) to a single network access cluster which includes two network devices, where each network device (e.g., leaf node) has an uplink to each of three upstream network devices (e.g., spine switches). During operation, network clients 102 can reach network clients 122 through any of the depicted paths based on load-balancing, e.g., using Equal Cost Multi-Path (ECMP) load-sharing algorithms. Network devices 112 and 114 may use links 116, 136, and 156 to transmit or communicate control information, but generally do not use these links as forwarding paths for transmitting data.

In the leaf-spine topology depicted in environment 100, network clients 102/122/142, network access clusters 110/130/150, and upstream network devices 101/121/141 can operate in an overlay network comprising an Ethernet Private Virtual Network (EVPN) deployed over a set of interconnected networks. A Layer 2 overlay network can be implemented by encapsulating Layer 2 frames as payloads in Layer 3 packets, e.g., based on a Virtual Extensible Local Area Network (VXLAN) protocol. The Layer 3 packets can be communicated through a Layer 3 underlay network. By using a Layer 2 network which overlays a Layer 3 network, Layer 2 virtual networks (e.g., virtual local area networks (VLANs)) can span across the Layer 3 network, possibly across different physical domains (e.g., different data centers, different campuses, different geographic sites, etc.). Network devices (e.g., switches or other types of network devices) can be used in a Layer 2 overlay network for a virtual private network (VPN) over a set of tunnels with corresponding tunnel endpoints. A respective tunnel endpoint can deploy a VPN by mapping a respective client VLAN to a corresponding tunnel network identifier (TNI). If the tunnel is formed based on VXLAN, the TNI can be a virtual network identifier (VNI) of a VXLAN header, and a tunnel endpoint can be a VXLAN tunnel endpoint (VTEP).

A network device (e.g., 112) used in a Layer 2 overlay network for a VPN can include a data plane entity that performs VXLAN encapsulation and decapsulation. This type of data plane entity can be referred to as a VXLAN tunnel endpoint (VTEP). The VTEP can be part of the data plane of the underlay and overlay network used for forwarding of data by the network device. The network device can also include a control plane entity (which is part of the control plane of the underlay and overlay network) that exchanges control information with other network devices to enable forwarding of data by the network devices (e.g., via ISL 116 between network devices 112 and 114). In some aspects, the control plane of the underlay and overlay network can operate based on EVPN.

In the overlay network depicted in FIG. 1, the illustrated entities can communicate via a Border Gateway Protocol (BGP). Network clients 102/122/142 can be VLANs and network devices 112/114, 132/134, and 152/154 can operate as VTEPs. Furthermore, network access clusters 110/130/150 can operate based on an underlay protocol such as Open Shortest Path First (OSPF).

Figure 2A:
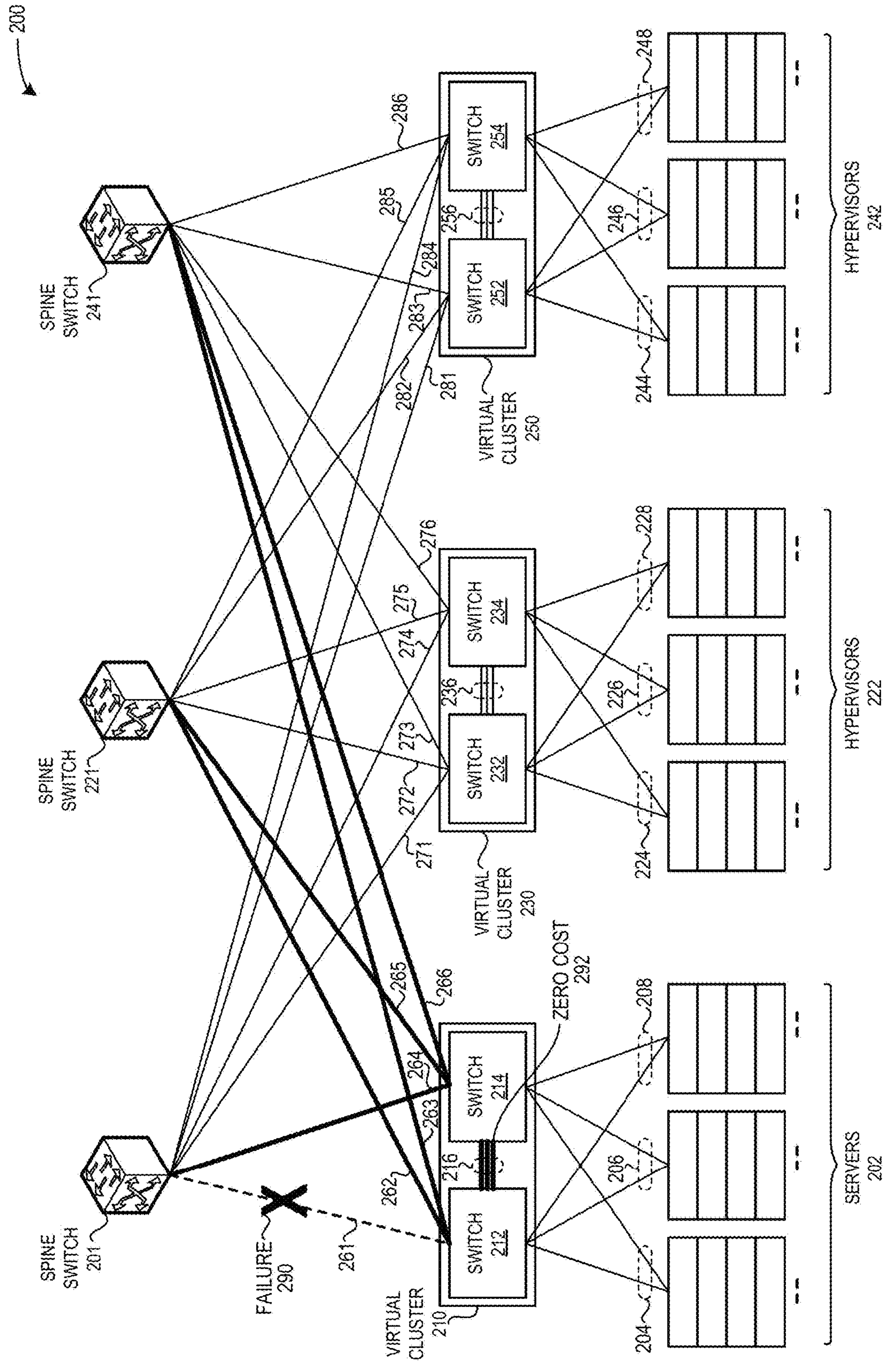
FIG. 2A illustrates an environment including setting a link cost to zero based on unequal uplink bandwidth, e.g., resulting from failure of an uplink, in accordance with an aspect of the present application.

FIG. 2A illustrates an environment 200 including setting a link cost to zero based on unequal uplink bandwidth, e.g., resulting from failure of an uplink, in accordance with an aspect of the present application. Environment 200 includes similar entities as environment 100. Environment 200 can depict a leaf-spine topology and include network clients (e.g., servers 202 and hypervisors 222 and 242) which communicate with each other via virtual clusters (e.g., leaf nodes or switches 212 and 214) and upstream network devices (e.g., spine switches 201, 221, and 241). Virtual cluster 210 can include switches 212 and 214, which can communicate with each other over an Inter-Switch Link (ISL) 216. ISL 216 can be a link aggregation group (LAG). Switch 212 can communicate with spine switch 201 via uplinks 261, 262, and 263, and switch 214 can communicate with spine switch 221 via uplinks 264, 265, and 266.

Similarly, in virtual cluster 230, switches 232 and 234 can communicate with each other over an ISL 236 and with spine switch 221 via, respectively, uplinks 271, 272, and 273 and uplinks 274, 275, and 276. In virtual cluster 250, switches 252 and 254 can communicate with each other over an ISL 256 and with spine switch 241 via, respectively, uplinks 281, 282, and 283 and uplinks 284, 285, and 286.

Each of uplinks 261-266, 271-276, and 281-286 can have a bandwidth of, e.g., 100 GB. When all uplinks are operating, switch 212 can have a bandwidth of 300 GB and switch 214 can also have a bandwidth of 300 GB.

Servers 202 can communicate with switches 212 and 214 of virtual cluster 210 via links 204, 206, and 208; hypervisors 222 can communicate with switches 232 and 234 of virtual cluster 230 via links 224, 226, and 228; and hypervisors 242 can communicate with switches 252 and 254 of virtual cluster 250 via links 244, 246, and 248. Each of links 204-208, 224-228, and 244-248 may have a lesser bandwidth (e.g., 25 GB) to a corresponding virtual cluster than the bandwidth (e.g., 100 GB) of each uplink to a corresponding spine switch.

As described above in relation to environment 100 of FIG. 1, during operation, servers 202 can reach hypervisors 222 through any of the depicted paths based on load-balancing, e.g., using ECMP load-sharing algorithms. ISLs 216, 236, and 256 between, respectively, switches 212 and 214, switches 232 and 234, and switches 252 and 254 may be used to transmit or communicate control information, but are generally not used as forwarding paths for transmitting data.

Switch 212 may detect a failure of uplink 261 to spine switch 201 (depicted by a bold X 290). As a result, the bandwidth of switch 212 can be updated from 300 GB to 200 GB. In current solutions, when switch 212 loses an uplink to spine switch 201, traffic sent to switch 212 (based on ECMP) can be forwarded to a spine switch only over the remaining two uplinks of switch 212 (e.g., via uplinks 262 and 263). Because ISL 216 is not used for forwarding traffic, switch 212 may experience oversubscription when servicing the same amount of incoming data using the reduced number of uplinks (2 instead of 3), which can result in congestion, dropped packets, etc. In some current solutions, ISL 216 cannot be activated as a possible routing path from switch 212 until all of the uplinks from switch 212 have failed (i.e., when none of uplinks 261-263 are operational).

The described aspects can address this limitation by detecting the failure of an uplink, updating the bandwidth, and setting a forwarding cost of ISL 216 based on a comparison of the bandwidth of switch 212 and the bandwidth of switch 214. The current or updated bandwidth information of each of switches 212 and 214 can be made available to the other switch using existing protocols and exchange of control information. The current bandwidth of switch 214 can be 300 GB, since all three of uplinks 264-266 are active and operating. The updated and current bandwidth of switch 212 can now be 200 GB, based on failure 290 of uplink 261. Switch 212 can compare its current bandwidth (200 GB) ("first bandwidth") to the bandwidth of switch 214 (300 GB) ("second bandwidth"). If the first bandwidth is less than the second bandwidth, switch 212 can set the forwarding cost of the link from switch 212 to switch 214 (i.e., ISL 216 from switch 212 to switch 214) to a value of zero. As a result, the path from switch 212 to switch 214 over ISL 216 has a cost of zero, which allows the paths via uplinks 264-266 of switch 214 to be selected by the routing protocol (e.g., ECMP) for traffic which is to be forwarded out of switch 212 to spine switches 201, 221, and 241. This can alleviate the oversubscription to switch 212 and its reduced bandwidth, including the reduced number, 2, of uplinks available to reach spine switches 201, 221, and 241. The resulting routes for traffic to be forwarded from switch 212 to spine switches 201, 221, and 241 after setting the cost to zero are depicted by a solid heavy line, e.g.: active uplinks 262 and 263 of switch 212; and uplinks 264, 265, and 266 via ISL (LAG) 216 from switch 212 to switch 214.

Figure 2B:
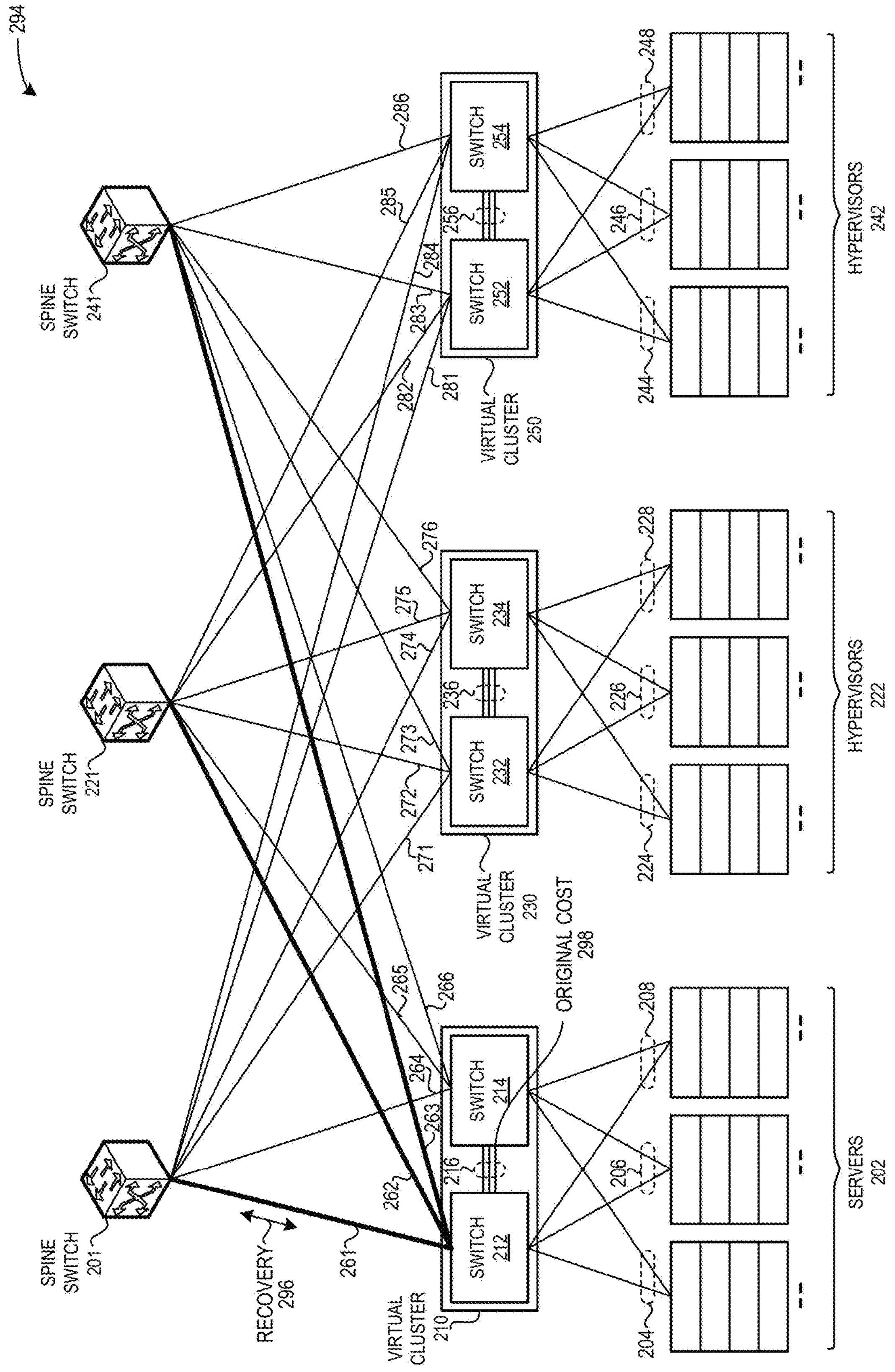
FIG. 2B illustrates an environment including setting a link cost to an original interface value based on unequal uplink bandwidth, e.g., resulting from recovery of an uplink failure, in accordance with an aspect of the present application.

FIG. 2B illustrates an environment 294 including setting a link cost to an original interface value based on unequal uplink bandwidth, e.g., resulting from recovery of an uplink failure, in accordance with an aspect of the present application. Environment 294 can include the same entities and communications as in environment 200 of FIG. 2A, at a later time. For example, after the communications as described above have occurred (i.e., switch 212 detects failure 290 of its uplink 261 to spine switch 201, updates its bandwidth, sets the forwarding cost of ISL 216 to zero, and allows the additional path to the spine switches via uplinks of switch 214 via ISL 216), switch 212 may detect a recovery 296 of the failure of uplink 261. Based on recovery 296, switch 212 can update its bandwidth from 200 GB to 300 GB. Switch 212 can again compare its current bandwidth (300 GB) ("first bandwidth") to the bandwidth of switch 214 (300 GB) ("second bandwidth"). If the first bandwidth is not less than (i.e., is greater than or equal to) the second bandwidth, switch 212 can set the forwarding cost of ISL 216 from switch 212 to switch 214 to an original cost (also referred to as an "original interface value"), e.g., 30 GB (as indicated by an original cost 298). By setting the ISL cost back to its original interface value, an ECMP routing protocol may no longer forward traffic destined for spine switches 201, 221, and 241 over ISL 216 to switch 214 and its uplinks 264-266. Thus, switch 212 can effectively remove the additional path to spine switches 201, 221, and 241 through uplinks 264-266 of switch 214. The resulting routes for traffic to be forwarded from switch 212 to spine switches 201, 221, and 241 after setting the cost back to the original value are depicted by a solid heavy line, e.g., active uplinks 261, 262, and 263 of switch 212.

Original cost 298 may be a standard interface value or may be a value configured by the user or an administrator. In general, ISL cost 216 can be set to this original cost upon initiation of virtual cluster 210. ISL cost 216 can be set to a value of zero when switch 212 determines that its bandwidth is less than the bandwidth of its peer switch 214, and ISL cost 216 can be set back to the original cost when switch 212 determines that its bandwidth is no longer less than (i.e., is greater than or equal to) the bandwidth of its peer switch 214.

The possibility of a loop may occur when both virtual cluster peers detect a failure of a respective uplink and subsequently set the ISL cost to a value of zero. In such a case, each of switch 212 and switch 214 may have routes pointed to each other, which can result in a loop. The described aspects can prevent the possibility of a loop by setting the ISL cost to zero only by a node when an unequal bandwidth is detected and only by the node which has the lower bandwidth, as described above in relation to setting to cost based on comparing the first bandwidth and the second bandwidth and further below in relation to FIG. 3. Thus, when the bandwidth becomes equal, the switch which originally set the cost to zero can restore the original interface value by setting the link to the original value.

In some aspects, setting the forwarding cost of ISL 216 to a value of zero or to the original interface value may be based on a condition other than an unequal bandwidth between switch 212 and 214. For example, the condition may be a measured metric associated with transmitting data to the upstream network device via the uplinks. These metrics can include: whether the first bandwidth is less than the second bandwidth by a minimum predetermined threshold, e.g., by at least 50 or 100 GB; whether a ratio of the first bandwidth to the second bandwidth is less than a predetermined ratio, e.g., a ratio less than 2:3 or 3:5; and operability of a predetermined percentage of the uplinks in the first group of uplinks, e.g., at least 70% of the uplinks are operable or less than 80% of the links are operable. Other metrics may be used based on information obtained during transmission of data through the leaf-spine topology of FIGS. 1, 2A, and 2B.

Figure 3A:
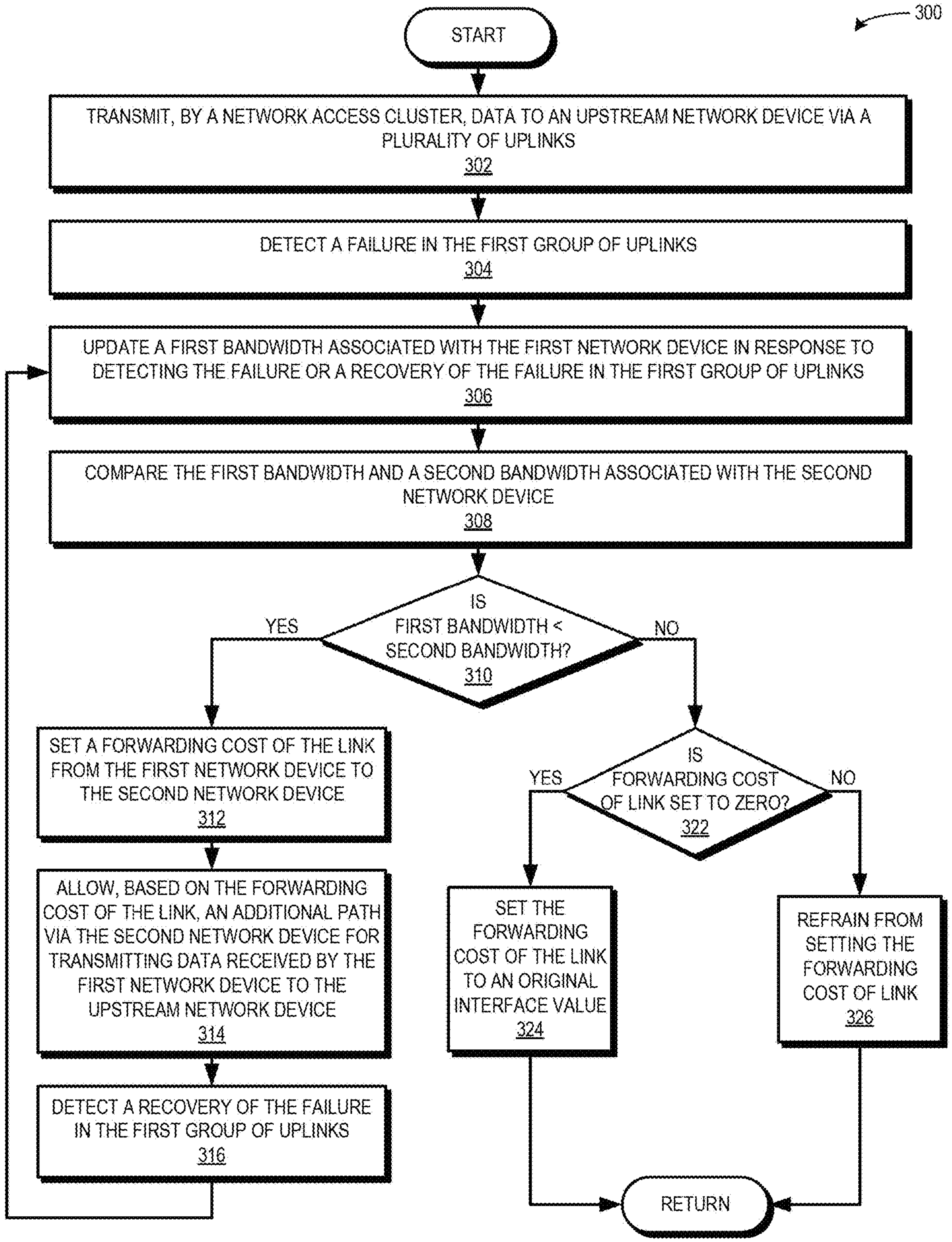
FIG. 3A presents a flowchart illustrating a method which facilitates enhancing traffic load-sharing in a network access cluster based on unequal uplink bandwidth, in accordance with an aspect of the present application.

FIG. 3A presents a flowchart 300 illustrating a method which facilitates enhancing traffic load-sharing in a network access cluster based on unequal uplink bandwidth, in accordance with an aspect of the present application. During operation, the system transmits, by a network access cluster, data to an upstream network device via a plurality of uplinks (operation 302). For example, network device 112 transmits data to upstream network devices 101, 121, and 141 via uplinks 161, 162, and 163 in FIG. 1. The network access cluster can include a plurality of network devices. In some aspects, the network access cluster can include a pair of network devices, such as a first network device and a second network device, as depicted above in relation to network access cluster 110 which includes network devices 112 and 114 and as depicted above in relation to virtual cluster 210 which includes switches 212 and 214. The first network device can communicate with the upstream network device via a first group of uplinks and the second network device can communicate with the upstream network device via a second group of uplinks. For example, in FIG. 1, network device 112 communicates with upstream network devices 101, 121, and 141 via uplinks 161, 162, and 163, and network device 114 communicates with upstream network devices 101, 121, and 141 via uplinks 164, 165, and 166. Similarly, in FIG. 2, switch 212 communicates with spine switches 201, 221, and 241 via uplinks 261, 262, and 263, and switch 214 communicates with spine switches 201, 221, and 241 via uplinks 264, 265, and 266. The first network device and the second network device can communicate via a link, such as an Inter-Switch Link (ISL), e.g., ISL 216 between switches 212 and 214 in FIGS. 2A and 2B.

The system detects a failure in the first group of uplinks (operation 304) used by the first network device to communicate with the upstream network device, e.g., as described above in relation to failure 290 of uplink 261 in FIG. 2A. The system updates a first bandwidth associated with the first network device in response to detecting the failure in the first group of uplinks (operation 306). In some aspects, the system can perform operation 306 (i.e., update the first bandwidth) in response to any change in the total uplink bandwidth of one of the peer network devices, where detecting the failure or recovery of a failure can be examples of conditions which cause a change in the total uplink bandwidth of one of the peer devices. As depicted in FIG. 2A, the first group of uplinks (261, 262, and 263) may include three uplinks. If the bandwidth for each uplink is 100 GB, the total bandwidth of the first group of uplinks (i.e., the first bandwidth associated with the first network device, e.g., switch 212) can be 300 GB when all three uplinks are operating properly. If one of the three uplinks fails, the first bandwidth associated with the first network device drops down to 200 GB from 300 GB. As a result, the system can update the first bandwidth associated with the first network device to 200 GB. Information such as the current bandwidth associated with a network device (switch 212) can be propagated between network devices in the network access cluster (e.g., to the second network device (switch 214)) via control packets or other control plane communication using existing protocols like BGP over a link between the peer network devices (e.g., ISL 216 between peer switches 212 and 214).

The system compares the first bandwidth and a second bandwidth associated with the second network device (operation 308). The first bandwidth can indicate a total uplink bandwidth of the first network device, while the second bandwidth can indicate a total uplink bandwidth of the second network device. The second bandwidth associated with the second network device may be part of the control information propagated between the network devices, which can be communicated based on a periodic synchronization process or a notification indicating a change in a respective total uplink bandwidth. Continuing with the example in FIG. 2A, the second group of uplinks may include three uplinks, each with a bandwidth of 100 GB, resulting in a total bandwidth of 300 GB for the second group of uplinks (i.e., the second bandwidth associated with the second network device, e.g., switch 214) when all three uplinks are operating properly.

The system compares the first bandwidth with the second bandwidth (operation 308) and determines whether the first bandwidth is less than the second bandwidth. Responsive to the first bandwidth being less than the second bandwidth (decision 310), the system sets a forwarding cost of the link from the first network device to the second network device (operation 312). The link from the first network device to the second network device can be an ISL, and setting the forwarding cost may be based on an Open Shortest Path First (OSPF) routing protocol. For example, because the first bandwidth (200 GB) is less than the second bandwidth (300 GB), the system can set the OSPF cost of the ISL from the first network device to the second network device to a value of zero, as described above in relation to setting the cost of ISL 216 to zero cost 292 in FIG. 2A. As a result, the system allows, based on the forwarding cost of the link, an additional path via the second network device for transmitting data received by the first network device to the upstream network device (operation 314). In FIG. 2A, the additional path can be indicated by the heavy solid line of ISL (or LAG) 216 from switch 212 to switch 214.

Subsequently, the system detects a recovery of the failure in the first group of uplinks (the "failed uplink") (operation 316). The recovery of the failed uplink may increase the bandwidth from a value of 200 GB to a value of 300 GB, as described above in relation to recovery 296 of previously failed uplink 261. The system updates the first bandwidth associated with the first network device in response to detecting the recovery of the failure in the first group of uplinks (returning to operation 306).

The system again compares the first bandwidth and the second bandwidth associated with the second network device (operation 308) and determines whether the first bandwidth is less than the second bandwidth (decision 310). At this point, the first bandwidth has been updated to 300 MB and the second bandwidth remains at 300 MB, so the result is that the two compared bandwidths are equal, as described above in relation to switch 212 comparing its current bandwidth of 300 GB to the bandwidth of 300 GB of switch 214 in FIG. 2B. Responsive to the first bandwidth being not less than the second bandwidth (i.e., the first bandwidth is greater than or equal to the second bandwidth) (decision 310), the system determines whether the forwarding cost of the link is set to a value of zero (decision 322). If the forwarding cost of the link is not set to a value of zero (decision 322), the system refrains from setting or updating the forwarding cost of the link (operation 326) and the operation returns.

If the forwarding cost of the link is set to a value of zero (decision 322), the system updates the forwarding cost of the link to an original interface value (operation 324), as described above in relation to switch 212 setting ISL cost 216 to a value of original cost 298 in FIG. 2B. The operation returns.

Network access clusters 110, 130, and 150 of FIG. 1 and virtual clusters 210, 230, and 250 of FIGS. 2A and 2B are depicted as each containing only two network devices or switches. In some aspects, a network cluster or a virtual cluster can include three or more network devices or switches configured in a ring or other topology. Upon detecting a failure of an uplink or a recovery of an uplink, a network device can update its bandwidth and perform the check to prevent loop prevention by determining whether to set a forwarding cost of its link to two or more adjacent nodes to a value of zero or an original interface value based on a comparison of its own bandwidth and the bandwidth of each of its adjacent nodes.

Figure 3B:
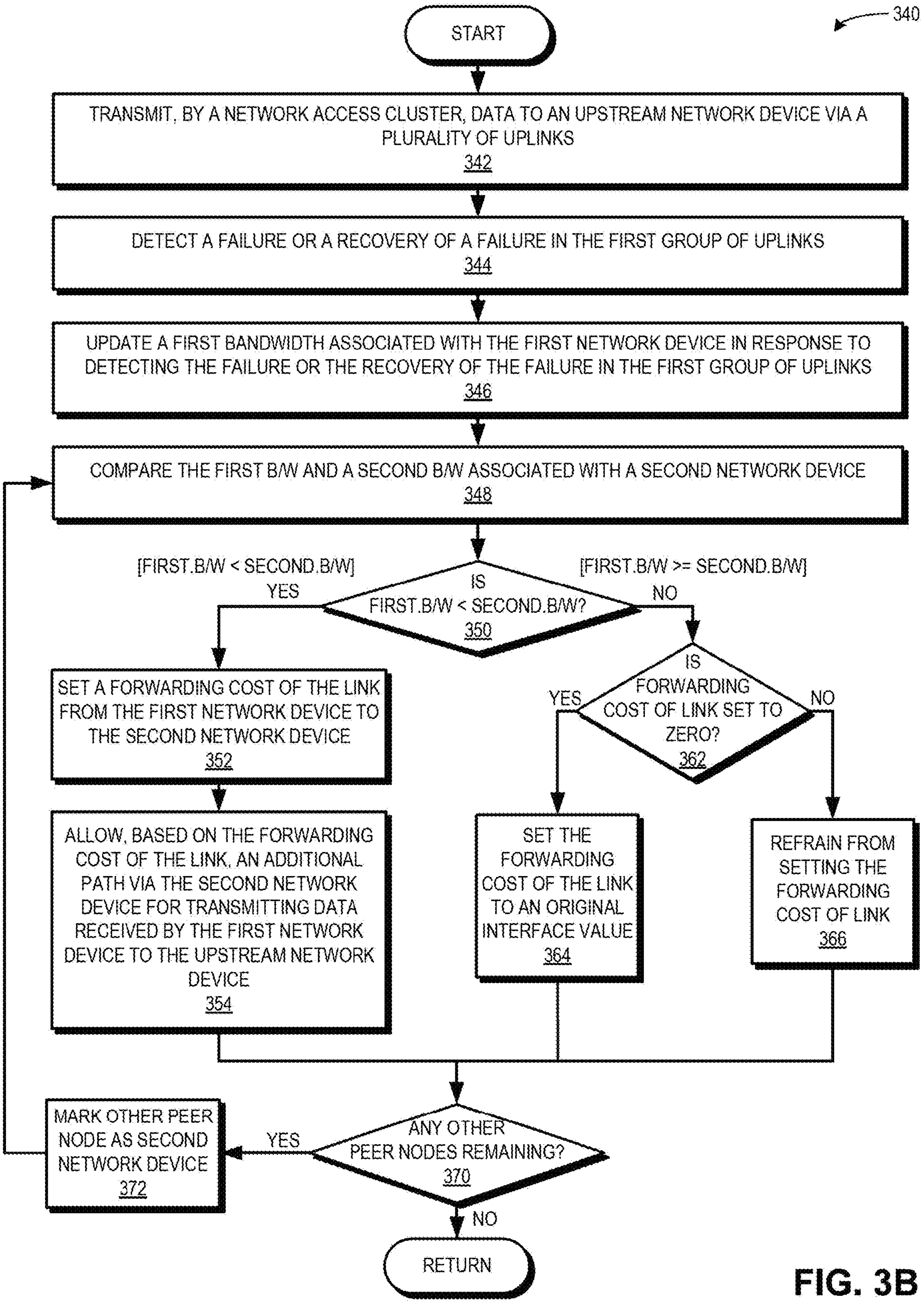
FIG. 3B presents a flowchart illustrating a method which facilitates enhancing traffic load-sharing in a network access cluster with three or more network devices based on unequal uplink bandwidth, in accordance with an aspect of the present application.

FIG. 3B presents a flowchart 340 illustrating a method which facilitates enhancing traffic load-sharing in a network access cluster with three or more network devices based on unequal uplink bandwidth, in accordance with an aspect of the present application. The operations in flowchart 340 are similar to the operations in flowchart 300 and are described accordingly. During operation, the system transmits, by a network access cluster, data to an upstream network device via a plurality of uplinks (operation 342, similar to operation 302). The network access cluster can include a plurality of network devices, such as three or more network devices configured in a ring or other topology. The network devices in the network access cluster can communicate with upstream network devices (e.g., spine switches) via uplinks (e.g., a first network device can communicate with a spine switch via a first group of uplinks) and with each other via links (e.g., ISLs).

The system detects a failure or a recovery of a failure in the first group of uplinks (operation 344, similar to operation 304) used by the first network device to communicate with the upstream network device. The system updates a first bandwidth associated with the first network device in response to detecting the failure or the recovery of the failure in the first group of uplinks (operation 346, similar to operation 306). The system compares the first bandwidth and a second bandwidth associated with the second network device (operation 348, similar to operation 308). The second network device can be one of two or more other peer or adjacent nodes of the first network device. The system determines whether the first bandwidth is less than the second bandwidth (decision 350), similar to decision 310). Responsive to the first bandwidth being less than the second bandwidth (decision 350), the system sets a forwarding cost of the link (e.g., to a value of zero) from the first network device to the second network device (operation 352, similar to operation 312). As a result, the system allows, based on the forwarding cost of the link, an additional path via the second network device for transmitting data received by the first network device to the upstream network device (operation 354, similar to operation 314).

The system determines whether any peer nodes remain (i.e., to be checked against to ensure loop prevention) (decision 370). If any peer nodes do remain (decision 370), the system marks another peer node as the second device (operation 372), and the operation continues at operation 348. If no peer nodes remain (decision 370), the operation returns (or returns to operation 342 (not shown)). The first network device can thus set the forwarding costs for respective links as needed by performing the loop prevention check (e.g., operations 348-354, 362-366, and 370-372) for each peer node, i.e., until no peer nodes against which to be checked remain.

At operation 344, the system can also detect a recovery of a failure in the first group of uplinks (the "failed uplink") (operation 344). The recovery of the failed uplink can result in an increase in the bandwidth. The system updates the first bandwidth associated with the first network device in response to detecting the failure or the recovery of the failure in the first group of uplinks (operation 346).

The system again compares the first bandwidth and the second bandwidth associated with the second network device (operation 348) and determines whether the first bandwidth is less than the second bandwidth (decision 350). At this point, the first bandwidth may have been updated to be equal to the second bandwidth. Responsive to the first bandwidth being not less than the second bandwidth (i.e., the first bandwidth is greater than or equal to the second bandwidth) (decision 350), the system determines whether the forwarding cost of the link is set to a value of zero (decision 362, similar to decision 322). If the forwarding cost of the link is not set to a value of zero (decision 362), the system refrains from setting or updating the forwarding cost of the link (operation 366, similar to operation 326). The system again iterates through all peer nodes of the first network device to determine how to set the forwarding costs by performing the loop prevention check (e.g., operations 348-354, 362-366, and 370-372) for each peer node, i.e., until no other peer nodes remain, in which case the operation returns (or returns to operation 342 (not shown)).

If the forwarding cost of the link is set to a value of zero (decision 362), the system updates the forwarding cost of the link to an original interface value (operation 364, similar to operation 324). The system again iterates through all peer nodes to determine how to set the forwarding costs by performing the loop prevention check (e.g., operations 348-354, 362-366, and 370-372) for each peer node, i.e., until no other peer nodes remain, in which case the operation returns (or returns to operation 342 (not shown)).

Figure 4:
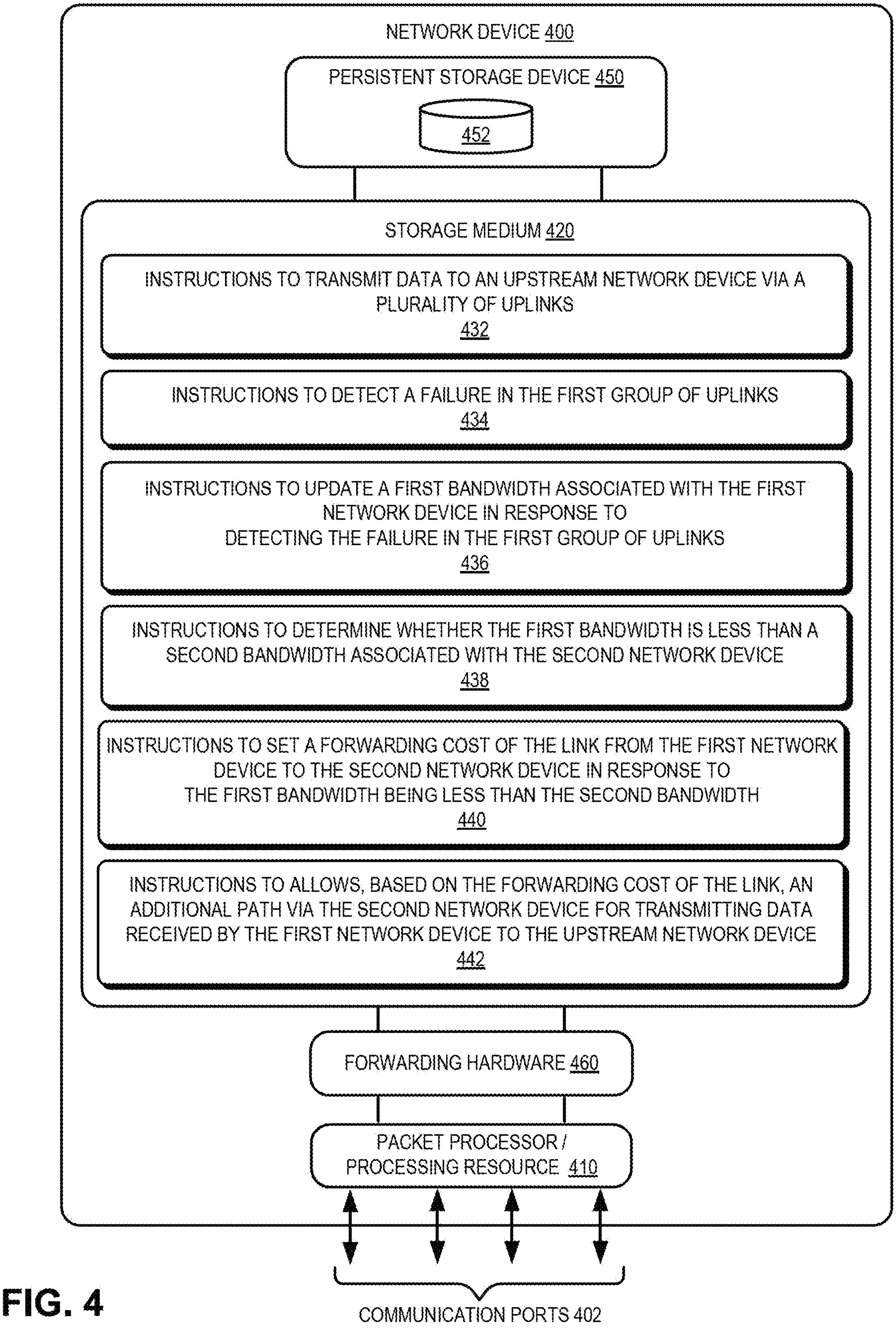
FIG. 4 illustrates a network device which facilitates enhancing traffic load-sharing in a network access cluster based on unequal uplink bandwidth, in accordance with an aspect of the present application.

FIG. 4 illustrates a network device 400 which facilitates enhancing traffic load-sharing in a network access cluster based on unequal uplink bandwidth, in accordance with an aspect of the present application. Network device 400, which can also be referred to as a switch, can include a number of communication ports 402, a packet processor/processing resource 410, and a persistent storage device 450. Network device 400 can also include forwarding hardware 460 (e.g., processing hardware of network device 400, such as its application-specific integrated circuit (ASIC) chips), which includes information based on which network device 400 processes packets (e.g., determines output ports for packets). Network device 400 can correspond to any of network devices 112, 114, 132, 134, 152, and 154 of FIG. 1 or switches 212, 214, 232, 234, 252, and 254 of FIGS. 2A and 2B.

Network device 400 can include at least one processing resource, such as packet processor/processing resource 410. Packet processor/processing resource 410 can extract and process header information from the received packets. Packet processor/processing resource 410 can identify a network device identifier (e.g., a MAC address and/or an IP address) associated with network device 400 in the header of a packet. Network device 400 can include a storage medium 420, which can be a non-transitory machine-readable storage medium. In some examples, storage medium 420 can include a set of volatile memory devices (e.g., dual in-line memory module (DIMM)) (not shown). Network device 400 can operate as a first switch in a pair of switches in a network access cluster, e.g., a VSX cluster, as described above in relation to switches 212 and 214 of virtual cluster 210 of FIGS. 2A and 2B.

Communication ports 402 can include inter-device communication channels for communication with other network devices and/or user devices. The communication channels can be implemented via a regular communication port and based on any open or proprietary format. Communication ports 402 can include one or more Ethernet ports capable of receiving frames encapsulated in an Ethernet header. Communication ports 402 can also include one or more IP ports capable of receiving IP packets. An IP port is capable of receiving an IP packet and can be configured with an IP address. Packet processor 410 can process Ethernet frames and/or IP packets. A respective port of communication ports 402 may operate as an ingress port and/or an egress port. Communications ports 402 may couple to, e.g., a downstream network client (e.g., a VLAN, hypervisor, or server) or an upstream network device (e.g., a spine switch), as described above in relation to FIGS. 1, 2A, and 2B.

Network device 400 can maintain a database 452 (e.g., in storage device 450). Database 452 can be a relational database and may run on one or more Database Management System (DBMS) instances. Database 452 can store information associated with the routing, configuration, and interfaces of network device 400. Database 452 may store the routing data structures populated based on various routing protocols. Network device 400 can store (in storage medium 420) instructions that when executed by packet processor/processing resource 410 can cause packet processor/processing resource 410 to execute the instructions. Storage medium 420 can include instructions that allow network device 400 to facilitate enhancing traffic load-sharing in a network access cluster based on unequal uplink bandwidth.

Storage medium 420 of network device 400 can further include instructions 432 to transmit data to an upstream network device via a plurality of uplinks. Network device 400 can be a first network device in a network access cluster which includes a second network device. Network device 400 can communicate with the upstream network device via a first group of uplinks, and the second network device can communicate with the upstream network device via a second group of uplinks. The first network device and the second network device can communicate via a link, e.g., an ISL. An example of a first and second network device as part of a network cluster and each communicating via a respective group of uplinks to an upstream device is described above in FIG. 1, e.g., network devices 112 and 114 as part of network access cluster 110, including uplinks 161, 162, and 163 from network device 112 to upstream network devices 101, 121, and 141 and further including uplinks 164, 165, and 166 from network device 114 to upstream network devices 101, 121, and 141.

Storage medium 420 can include instructions 434 to detect a failure in the first group of uplinks and instructions 436 to update a first bandwidth associated with the first network device in response to detecting the failure in the first group of uplinks, as described above in FIG. 2A in relation to failure 290 of uplink 261 in the first group of uplinks from switch 212 to spines switches 201, 221, and 241 and the subsequent updating of the bandwidth in response to detecting the failure. Storage medium 420 can include instructions 438 to determine whether the first bandwidth is less than a second bandwidth associated with the second network device. Storage medium 420 can include instructions 440 to set a forwarding cost of the link from the first network device to the second network device in response to the first bandwidth being less than the second bandwidth, as described above in relation to switch 212 setting the cost of ISL 216 to zero cost 292 in FIG. 2A.

Storage medium 420 can include instructions 442 to allow, based on the forwarding cost of the link, an additional path via the second network device for transmitting data received by the first network device to the upstream network device, as described above in relation to ISL 216 indicated by the heavy solid line as an additional allowed path in FIG. 2A.

Storage medium 420 may include more instructions than those shown in FIG. 4. For example, storage medium 420 can also store instructions for executing the operations described above in relation to: the environments of FIGS. 1, 2A, and 2B; the operations depicted in flowchart 300 of FIG. 3; and instructions 522-530 of CRM 500 in FIG. 5.

Figure 5:
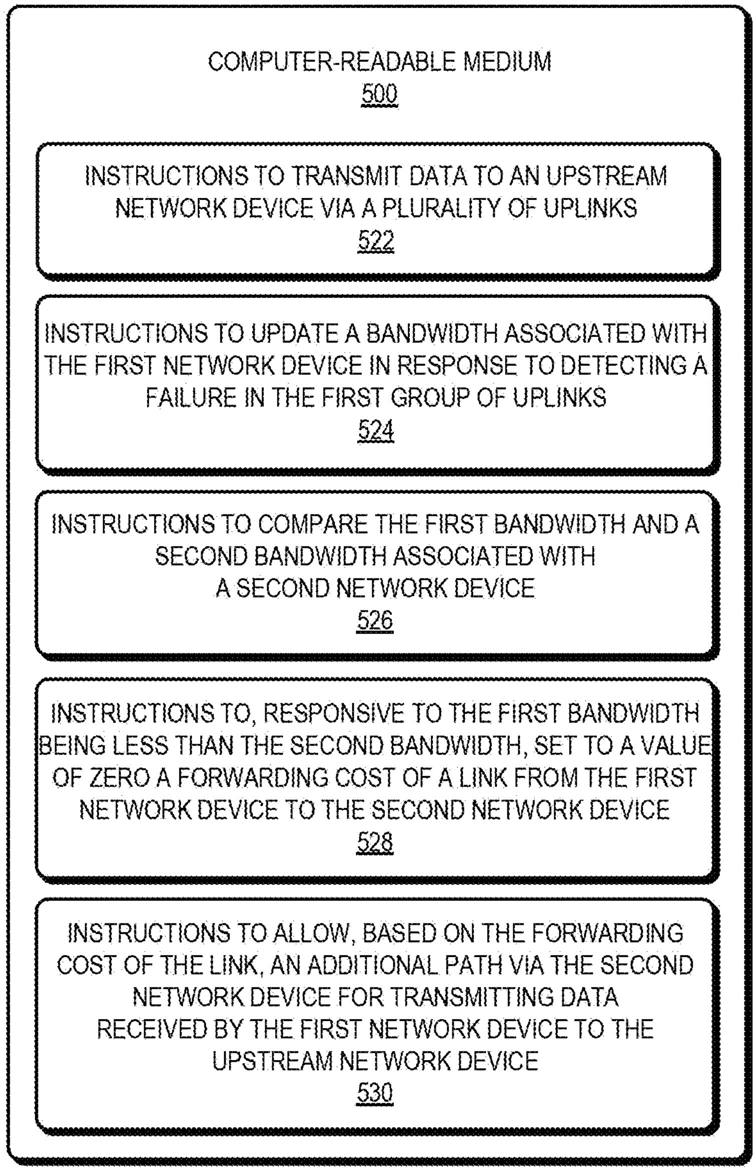
FIG. 5 illustrates a non-transitory computer-readable medium (CRM) which facilitates enhancing traffic load-sharing in a network access cluster based on unequal uplink bandwidth, in accordance with an aspect of the present application.

FIG. 5 illustrates a non-transitory computer-readable medium (CRM) 500 which facilitates enhancing traffic load-sharing in a network access cluster based on unequal uplink bandwidth, in accordance with an aspect of the present application. CRM 500 can be part of a computer system or a network device, e.g., a first network device depicted as switch 212 in FIG. 2A. CRM 500 can store instructions which when executed by at least one processing resource (not shown) cause the at least one processing resource to execute the instructions. CRM 500 can include instructions 522 to transmit data to an upstream network device via a plurality of uplinks.

CRM 500 can include instructions 524 to update a first bandwidth associated with the first network device in response to detecting a failure in the first group of uplinks, as described above in relation to failure 290 of uplink 261 in the first group of uplinks from switch 212 to spines switches 201, 221, and 241 in FIG. 2A and the subsequent updating of the bandwidth in response to detecting the failure. CRM 500 can include instructions 526 to compare the first bandwidth and a second bandwidth associated with the second network device. CRM 500 can further include instructions to, responsive to the first bandwidth being less than the second bandwidth, set to a value of zero a forwarding cost of the link from the first network device to the second network device, as described above in relation to switch 212 setting the cost of ISL 216 to zero cost 292 in FIG. 2A. CRM 500 can include instructions to allow, based on the forwarding cost of the link, an additional path via the second network device for transmitting data received by the first network device to the upstream network device, as described above in relation to ISL 216 indicated by the heavy solid line as an additional allowed path in FIG. 2A.

CRM 500 may include more instructions than those shown in FIG. 5. For example, CRM 500 can also store instructions for executing the operations described above in relation to: the environments of FIGS. 1, 2A, and 2B; the operations depicted in flowchart 300 of FIG. 3; and instructions 432-442 of storage medium 420 in FIG. 4.

In general, the disclosed aspects provide a method, computer system, and non-transitory computer-readable storage medium which facilitate enhancing traffic load-sharing in a network access cluster based on unequal uplink bandwidth. In one aspect, a method is performed, e.g., by a system or a network access cluster. The system transmits, by a network access cluster, data to an upstream network device via a plurality of uplinks. The network access cluster comprises a first network device and a second network device, each of which communicates with the upstream network device via, respectively, a first group of uplinks and a second group of uplinks. The first network device and the second network device communicate via a link. The system updates a first bandwidth associated with the first network device in response to detecting a failure in the first group of uplinks. The system compares the first bandwidth and a second bandwidth associated with the second network device. Responsive to the first bandwidth being less than the second bandwidth, the system sets a forwarding cost of the link from the first network device to the second network device. The system allows, based on the forwarding cost of the link, an additional path via the second network device for transmitting the data received by the first network device to the upstream network device.

In a variation on this aspect, the system sets the forwarding cost of the link by setting the forwarding cost of the link to a value of zero.

In a further variation on this aspect, the system detects a recovery of the failure in the first group of uplinks. The system updates the first bandwidth associated with the first network device in response to detecting the recovery of the failure in the first group of uplinks. Responsive to the first bandwidth being greater than or equal to the second bandwidth and the forwarding cost of the link being equal to zero, the system sets the forwarding cost of the link to an original interface value.

In a further variation, setting the forwarding cost of the link to a value of zero or to the original interface value is based on at least one of: a measured metric associated with transmitting the data to the upstream network device via the plurality of uplinks; whether the first bandwidth is less than the second bandwidth by a minimum predetermined threshold; whether a ratio of the first bandwidth to the second bandwidth is greater than a predetermined ratio; or detecting operability of a predetermined percentage of the uplinks in the first group of uplinks.

In a further variation, the network access cluster comprises one or more other network devices. The first network device, the second network device, and the other network devices are configured as peer network devices in a ring topology. A respective network device communicates with its respective peer network devices via links. For each respective peer network device of the first network device, the system performs the following operations: the system marks the respective peer network device as the second network device, wherein the second bandwidth is associated with the respective peer network device; the system updates the first bandwidth associated with the first network device in response to detecting the failure or the recovery of the failure in the first group of uplinks; the system sets a forwarding cost of the link from the first network device to the second network device to the value of zero in response to the first bandwidth being less than the second bandwidth; the system allows, based on the forwarding cost of the link, an additional path via the second network device for transmitting the data received by the first network device to the upstream network device; and the system sets the forwarding cost of the link to the original interface value in response to the first bandwidth being greater than or equal to the second bandwidth and the forwarding cost of the link being equal to zero In a further variation, responsive to updating the first bandwidth, the system determines whether the first bandwidth is greater than or equal to the second bandwidth and whether the forwarding cost of the link is not equal to zero. Responsive to determining that the first bandwidth is greater than or equal to the second bandwidth and that the forwarding cost of the link is not equal to zero, the system refrains from setting the forwarding cost of the link.

In a further variation, the system prevents over-subscription to the first network device during the failure in the first group of uplinks by transmitting the data via other uplinks in the first group of uplinks and via the additional path to the second group of uplinks of the second network device.

In a further variation, the system sets the forwarding cost of the link based on an Open Shortest Path First (OSPF) routing protocol.

In a further variation, the additional path is allowed subsequent to detecting the failure in the first group of uplinks and prior to detecting a recovery of the failure in the first group of uplinks.

In a further variation, the data transmitted to the upstream network device via the plurality of uplinks is received by the network access cluster from network clients. The network clients, the network access cluster, and the upstream network device operate in an overlay network comprising an Ethernet Private Virtual Network (EVPN). The network clients comprise virtual extensible local area networks (VXLANs), and the first network device and the second network device in the network access cluster comprise virtual tunnel endpoints (VTEPs). Entities in the overlay network communicate via a Border Gateway Protocol (BGP).

In another aspect, a network device comprises at least one processing resource, a plurality of ports, and a non-transitory machine-readable storage medium storing instructions that when executed by the at least one processing resource cause the at least one processing resource to execute the instructions. The instructions are to transmit data to an upstream network device via a plurality of uplinks, wherein the network device comprises a first network device in a network access cluster which includes a second network device, wherein the first network device communicates with the upstream network device via a first group of uplinks, wherein the second network device communicates with the upstream network device via a second group of uplinks, and wherein the first network device and the second network device communicate with each other via a link. The instructions are further to detect a failure in the first group of uplinks and update a first bandwidth associated with the first network device in response to detecting the failure in the first group of uplinks. The instructions are further to determine whether the first bandwidth is less than a second bandwidth associated with the second network device. The instructions are further to set a forwarding cost of the link from the first network device to the second network device in response to the first bandwidth being less than the second bandwidth. The instructions are further to allow, based on the forwarding cost of the link, an additional path via the second network device and the second group of uplinks for transmitting the data received by the first network device to the upstream network device. The storage device of the network device may include more instructions, including in relation to, e.g.: the environments of FIGS. 1, 2A, and 2B; the operations depicted in flowchart 300 of FIG. 3; and the instructions of CRM 500 in FIG. 5.

In yet another aspect, a non-transitory computer-readable storage medium of a first network device stores instructions which when executed by at least one processing resource cause the at least one processing resource to execute the instructions. The instructions are to transmit data to an upstream network device via a plurality of uplinks, wherein a network access cluster comprises the first network device and a second network device, each of which communicates with the upstream network device via, respectively, a first group of uplinks and a second group of uplinks, and wherein the first network device and the second network device communicate via a link. The instructions are further to update a first bandwidth associated with the first network device in response to detecting a failure in the first group of uplinks. The instructions are further to compare the first bandwidth and a second bandwidth associated with the second network device, and, responsive to the first bandwidth being less than the second bandwidth, set to a value of zero a forwarding cost of the link from the first network device to the second network device. The instructions are further to allow, based on the forwarding cost of the link, an additional path via the second network device and the second group of uplinks for transmitting the data received by the first network device to the upstream network device. The non-transitory computer-readable storage medium of the first network device may include instructions, including in relation to, e.g.: the environments of FIGS. 1, 2A, and 2B; the operations depicted in flowchart 300 of FIG. 3; and instructions 432-442 of storage medium 420 in FIG. 4.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method, comprising:

transmitting, by a network access cluster, data to an upstream network device via a plurality of uplinks, wherein the network access cluster comprises a first network device and a second network device, each of which communicates with the upstream network device via, respectively, a first group of uplinks and a second group of uplinks, and wherein the first network device and the second network device communicate via a link;

updating a first bandwidth associated with the first network device in response to detecting a failure in the first group of uplinks;

comparing the first bandwidth and a second bandwidth associated with the second network device;

responsive to the first bandwidth being less than the second bandwidth, setting a forwarding cost of the link from the first network device to the second network device; and allowing, based on the forwarding cost of the link, an additional path via the second network device for transmitting the data received by the first network device to the upstream network device.

2. The method of claim 1, wherein setting the forwarding cost of the link comprises setting the forwarding cost of the link to a value of zero.

3. The method of claim 2, further comprising:

detecting a recovery of the failure in the first group of uplinks;

updating the first bandwidth associated with the first network device in response to detecting the recovery of the failure in the first group of uplinks; and responsive to the first bandwidth being greater than or equal to the second bandwidth and the forwarding cost of the link being equal to zero, setting the forwarding cost of the link to an original interface value.

4. The method of claim 3, wherein setting the forwarding cost of the link to a value of zero or to the original interface value is based on at least one of:

a measured metric associated with transmitting the data to the upstream network device via the plurality of uplinks;

whether the first bandwidth is less than the second bandwidth by a minimum predetermined threshold;

whether a ratio of the first bandwidth to the second bandwidth is less than a predetermined ratio; or detecting operability of a predetermined percentage of the uplinks in the first group of uplinks.

5. The method of claim 3, wherein the network access cluster comprises one or more other network devices, wherein the first network device, the second network device, and the other network devices are configured as peer network devices in a ring topology, wherein a respective network device communicates with its respective peer network devices via links, and wherein the method further comprises, for a respective peer network device of the first network device:

marking the respective peer network device as the second network device, wherein the second bandwidth is associated with the respective peer network device;

updating the first bandwidth associated with the first network device in response to detecting the failure or the recovery of the failure in the first group of uplinks;

setting a forwarding cost of the link from the first network device to the second network device to the value of zero in response to the first bandwidth being less than the second bandwidth;

allowing, based on the forwarding cost of the link, an additional path via the second network device for transmitting the data received by the first network device to the upstream network device; and setting the forwarding cost of the link to the original interface value in response to the first bandwidth being greater than or equal to the second bandwidth and the forwarding cost of the link being equal to zero.

6. The method of claim 1, further comprising:

responsive to updating the first bandwidth, determining whether the first bandwidth is greater than or equal to the second bandwidth and whether the forwarding cost of the link is not equal to zero; and responsive to determining that the first bandwidth is greater than or equal to the second bandwidth and that the forwarding cost of the link is not equal to zero, refraining from setting the forwarding cost of the link.

7. The method of claim 1, further comprising:

preventing over-subscription to the first network device during the failure in the first group of uplinks by transmitting the data via other uplinks in the first group of uplinks and via the additional path to the second group of uplinks of the second network device.

8. The method of claim 1, further comprising:

setting the forwarding cost of the link based on an Open Shortest Path First (OSPF) routing protocol.

9. The method of claim 1, wherein the additional path is allowed subsequent to detecting the failure in the first group of uplinks and prior to detecting a recovery of the failure in the first group of uplinks.

10. The method of claim 1, wherein the data transmitted to the upstream network device via the plurality of uplinks is received by the network access cluster from network clients, wherein the network clients, the network access cluster, and the upstream network device operate in an overlay network comprising an Ethernet Private Virtual Network (EVPN), wherein the network clients comprise virtual extensible local area networks (VXLANs), wherein the first network device and the second network device in the network access cluster comprise virtual tunnel endpoints (VTEPs), and wherein entities in the overlay network communicate via a Border Gateway Protocol (BGP).

11. A network device, comprising:

at least one processing resource;

a plurality of ports; and a non-transitory machine-readable storage medium storing instructions that when executed by the at least one processing resource cause the at least one processing resource to execute the instructions to:

transmit data to an upstream network device via a plurality of uplinks, wherein the network device comprises a first network device in a network access cluster which includes a second network device, wherein the first network device communicates with the upstream network device via a first group of uplinks, wherein the second network device communicates with the upstream network device via a second group of uplinks, and wherein the first network device and the second network device communicate with each other via a link;

detect a failure in the first group of uplinks;

update a first bandwidth associated with the first network device in response to detecting the failure in the first group of uplinks;

determine whether the first bandwidth is less than a second bandwidth associated with the second network device;

set a forwarding cost of the link from the first network device to the second network device in response to the first bandwidth being less than the second bandwidth; and allow, based on the forwarding cost of the link, an additional path via the second network device and the second group of uplinks for transmitting the data received by the first network device to the upstream network device.

12. The network device of claim 11, wherein setting the forwarding cost of the link comprises setting the forwarding cost of the link to a value of zero based on an Open Shortest Path First (OSPF) routing protocol.

13. The network device of claim 12, the instructions further to:

detect a recovery of the failure in the first group of uplinks;

update the first bandwidth associated with the first network device in response to detecting the recovery of the failure in the first group of uplinks;

determine whether the first bandwidth is greater than or equal to the second bandwidth;

determine whether the forwarding cost of the link is equal to zero; and responsive to the first bandwidth being greater than or equal to the second bandwidth and the forwarding cost of the link being equal to zero, set the forwarding cost of the link to an original interface value.

14. The network device of claim 13, wherein setting the forwarding cost of the link to a value of zero or to the original interface value is based on at least one of:

a measured metric associated with transmitting the data to the upstream network device via the plurality of uplinks;

whether the first bandwidth is less than the second bandwidth by a minimum predetermined threshold;

whether a ratio of the first bandwidth to the second bandwidth is less than a predetermined ratio; or a status of operability associated with a predetermined percentage of the uplinks in the first group of uplinks.

15. The network device of claim 11, the instructions further to:

responsive to updating the first bandwidth, determine whether the first bandwidth is greater than or equal to the second bandwidth and whether the forwarding cost of the link is not equal to zero; and responsive to determining that the first bandwidth is greater than or equal to the second bandwidth and that the forwarding cost of the link is not equal to zero, refrain from setting the forwarding cost of the link.

16. The network device of claim 11, the instructions further to:

prevent over-subscription to the first network device during the failure in the first group of uplinks by transmitting the data via other uplinks in the first group of uplinks and via the additional path to the second group of uplinks of the second network device.

17. The network device of claim 11, the instructions further to:

allow the additional path subsequent to detecting the failure in the first group of uplinks and prior to detecting a recovery of the failure in the first group of uplinks.

18. A non-transitory computer-readable storage medium of a first network device storing instructions which when executed by at least one processing resource cause the at least one processing resource to execute the instructions to:

transmit data to an upstream network device via a plurality of uplinks, wherein a network access cluster comprises the first network device and a second network device, each of which communicates with the upstream network device via, respectively, a first group of uplinks and a second group of uplinks, and wherein the first network device and the second network device communicate via a link;

update a first bandwidth associated with the first network device in response to detecting a failure in the first group of uplinks;

compare the first bandwidth and a second bandwidth associated with the second network device;

responsive to the first bandwidth being less than the second bandwidth, set to a value of zero a forwarding cost of the link from the first network device to the second network device; and allow, based on the forwarding cost of the link, an additional path via the second network device and the second group of uplinks for transmitting the data received by the first network device to the upstream network device.

19. The non-transitory computer-readable storage medium of claim 18, the instructions further to:

detect a recovery of the failure in the first group of uplinks;

update the first bandwidth associated with the first network device in response to detecting the recovery of the failure in the first group of uplinks; and responsive to the first bandwidth being greater than or equal to the second bandwidth and the forwarding cost of the link being equal to zero, set the forwarding cost of the link to an original interface value.

20. The non-transitory computer-readable storage medium of claim 18, wherein the data transmitted to the upstream network device via the plurality of uplinks is received from network clients, wherein the network clients, the network access cluster, and the upstream network device operate in an overlay network comprising an Ethernet Private Virtual Network (EVPN), wherein the network clients comprise virtual extensible local area networks (VXLANs), wherein the first network device and the second network device in the network access cluster comprise virtual tunnel endpoints (VTEPs), and wherein entities in the overlay network communicate via a Border Gateway Protocol (BGP).

* * * * *